United States Patent
Chamberlin et al.

(10) Patent No.: US 8,803,380 B2
(45) Date of Patent: Aug. 12, 2014

(54) ELECTRIC MACHINE MODULE COOLING SYSTEM AND METHOD

(75) Inventors: Bradley D. Chamberlin, Pendleton, IN (US); David A. Fulton, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 145 days.

(21) Appl. No.: 13/488,327

(22) Filed: Jun. 4, 2012

(65) Prior Publication Data

US 2012/0305226 A1  Dec. 6, 2012

Related U.S. Application Data

(60) Provisional application No. 61/493,310, filed on Jun. 3, 2011.

(51) Int. Cl.
*H02K 9/00* (2006.01)

(52) U.S. Cl.
USPC ................................. 310/54; 310/64

(58) Field of Classification Search
USPC .......................... 310/52, 54, 58, 64, 60 A, 61
See application file for complete search history.

(56) References Cited

U.S. PATENT DOCUMENTS

| | | |
|---|---|---|
| 2,080,678 A | 5/1937 | Van Horn et al. |
| 2,264,616 A | 12/1941 | Buckbee |
| 3,447,002 A | 5/1969 | Ronnevig |
| 3,525,001 A | 8/1970 | Erickson |
| 3,748,507 A | 7/1973 | Sieber |
| 4,038,570 A | 7/1977 | Durley, III |
| 5,081,382 A | 1/1992 | Collings et al. |
| 5,180,004 A | 1/1993 | Nguyen |
| 5,207,121 A | 5/1993 | Blen |
| 5,293,089 A | 3/1994 | Frister |
| 5,372,213 A | 12/1994 | Hasebe et al. |
| 5,519,269 A | 5/1996 | Lindberg |
| 5,616,973 A | 4/1997 | Khazanov |
| 5,859,482 A | 1/1999 | Crowell et al. |
| 5,923,108 A | 7/1999 | Matake et al. |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

International Search Report, Received Jul. 31, 2012.

(Continued)

*Primary Examiner* — Hanh Nguyen
(74) *Attorney, Agent, or Firm* — Greenberg Traurig, LLP

(57) ABSTRACT

Embodiments of the invention provide an electric machine module. The module can include a housing that can define a machine cavity. The housing can include a coolant jacket that contains a first coolant. A coolant sump can be in fluid communication with the machine cavity and can contain a second coolant that is different than the first coolant. The coolant sump can be in thermal communication with the coolant jacket. An electric machine can be positioned within the machine cavity. The electric machine can include a stator assembly, a rotor assembly, and a shaft. The module can also include at least one coolant channel, at least one shaft channel, and at least one rotor channel.

15 Claims, 11 Drawing Sheets

(56) References Cited

U.S. PATENT DOCUMENTS

| | | |
|---|---|---|
| 5,937,817 A | 8/1999 | Schanz et al. |
| 5,965,965 A | 10/1999 | Umeda et al. |
| 6,011,332 A | 1/2000 | Umeda et al. |
| 6,069,424 A | 5/2000 | Colello et al. |
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 2003/0222519 A1 | 12/2003 | Bostwick |
| 2004/0036367 A1 | 2/2004 | Denton et al. |
| 2004/0189110 A1 | 9/2004 | Ide |
| 2004/0195929 A1 | 10/2004 | Oshidari |
| 2005/0023266 A1 | 2/2005 | Ueno et al. |
| 2005/0023909 A1 | 2/2005 | Cromas |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2007/0278869 A1* | 12/2007 | Taketsuna ............... 310/54 |
| 2008/0223557 A1 | 9/2008 | Fulton et al. |
| 2009/0102298 A1* | 4/2009 | Savant et al. ............. 310/52 |
| 2009/0121562 A1 | 5/2009 | Yim |
| 2009/0134749 A1* | 5/2009 | Nakamura et al. ...... 310/68 D |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2010/0264760 A1* | 10/2010 | Matsui et al. ............ 310/54 |
| 2011/0050141 A1 | 3/2011 | Yeh et al. |
| 2011/0101700 A1 | 5/2011 | Stiesdal |
| 2011/0109095 A1 | 5/2011 | Stiesdal |
| 2011/0298315 A1* | 12/2011 | Fulton ..................... 310/54 |
| 2013/0076169 A1* | 3/2013 | Pal ........................... 310/59 |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

WIPO Search Report and Written Opinion dated Oct. 29, 2012 for corresponding Application No. PCT/US2012/033915; 8 sheets.

WIPO Search Report and Written Opinion dated Nov. 14, 2012 for corresponding Application No. PCT/US2012/040794; 8 sheets.

International Search Report, Received Jan. 9, 2012.

International Search Report, Received Feb. 16, 2012.

International Search Report, Received Dec. 22, 2011.

International Search Report, Received Dec. 5, 2011.

(56) References Cited

OTHER PUBLICATIONS

International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.

* cited by examiner

ELECTRIC MACHINE MODULE COOLING SYSTEM AND METHOD

RELATED APPLICATIONS

This application claims priority under 35 U.S.C. §119 to U.S. Provisional Patent Application No. 61/493,310 filed on Jun. 3, 2011, the entire contents of which is incorporated herein by reference.

BACKGROUND

Electric machines, often contained within a machine cavity of a housing, generally include a stator and a rotor. For some electric machines, the stator can be secured to the housing different coupling techniques to generally secure the electric machine within the housing. During operation of some electric machines, heat energy can by generated by both the stator and the rotor, as well as other components of the electric machine. For some electric machines, the increase in heat energy can, at least partially, impact electric machine operations.

SUMMARY

Some embodiments of the invention provide an electric machine module. The module can include a housing, which can define a machine cavity. In some embodiments, the housing can include at least a portion of a coolant jacket, which can be configured to contain a first coolant. A coolant sump can be in fluid communication with the machine cavity and can be capable of containing a second coolant that is different from the first coolant. In some embodiments, the coolant sump can be in thermal communication with the coolant jacket. In some embodiments, an electric machine can be positioned within the machine cavity and can be at least partially enclosed by the housing. The electric machine can include a stator assembly, a rotor assembly that can be at least partially circumscribed by a portion of the stator assembly, and a shaft being that can be operatively coupled to the rotor assembly. In some embodiments, an air gap can be defined between a portion of the stator assembly and a portion of the rotor assembly. In some embodiments, the coolant sump can positioned so that no material amounts of the second coolant can enter the air gap.

DETAILED DESCRIPTION

Figure 1:
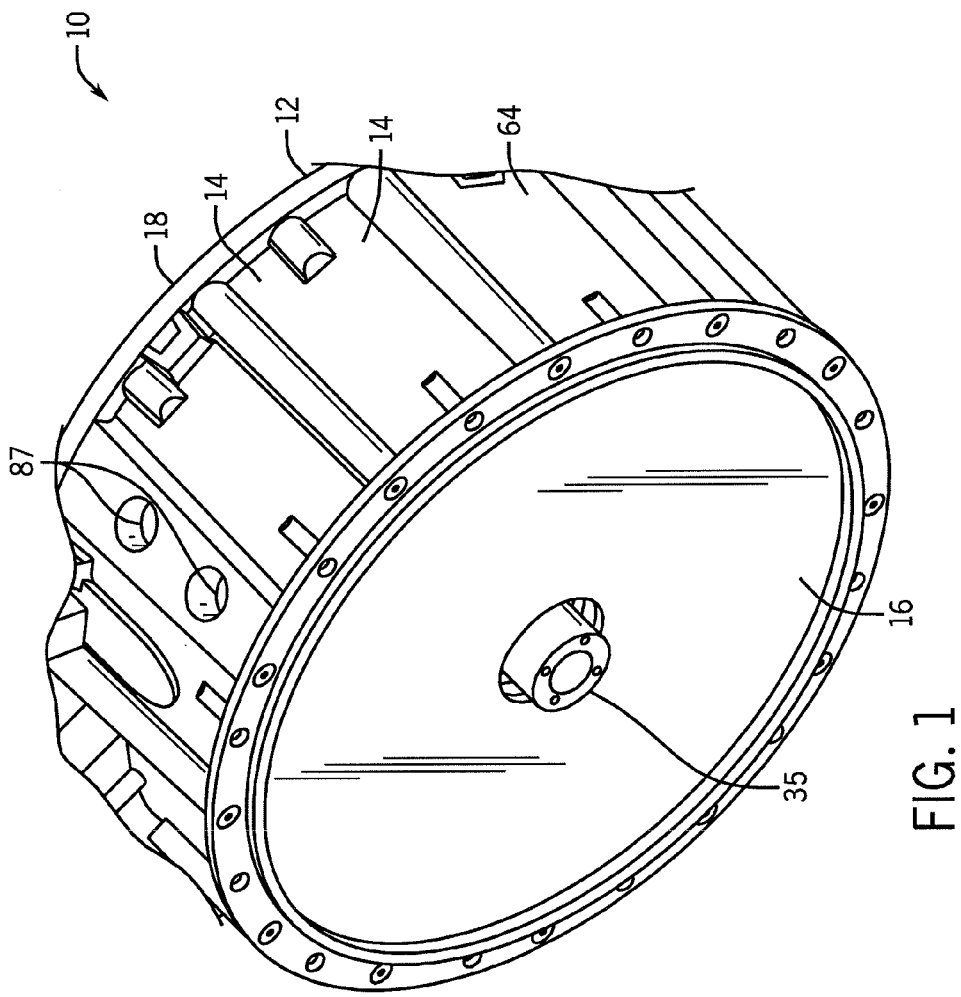
FIG. 1 is an isometric view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
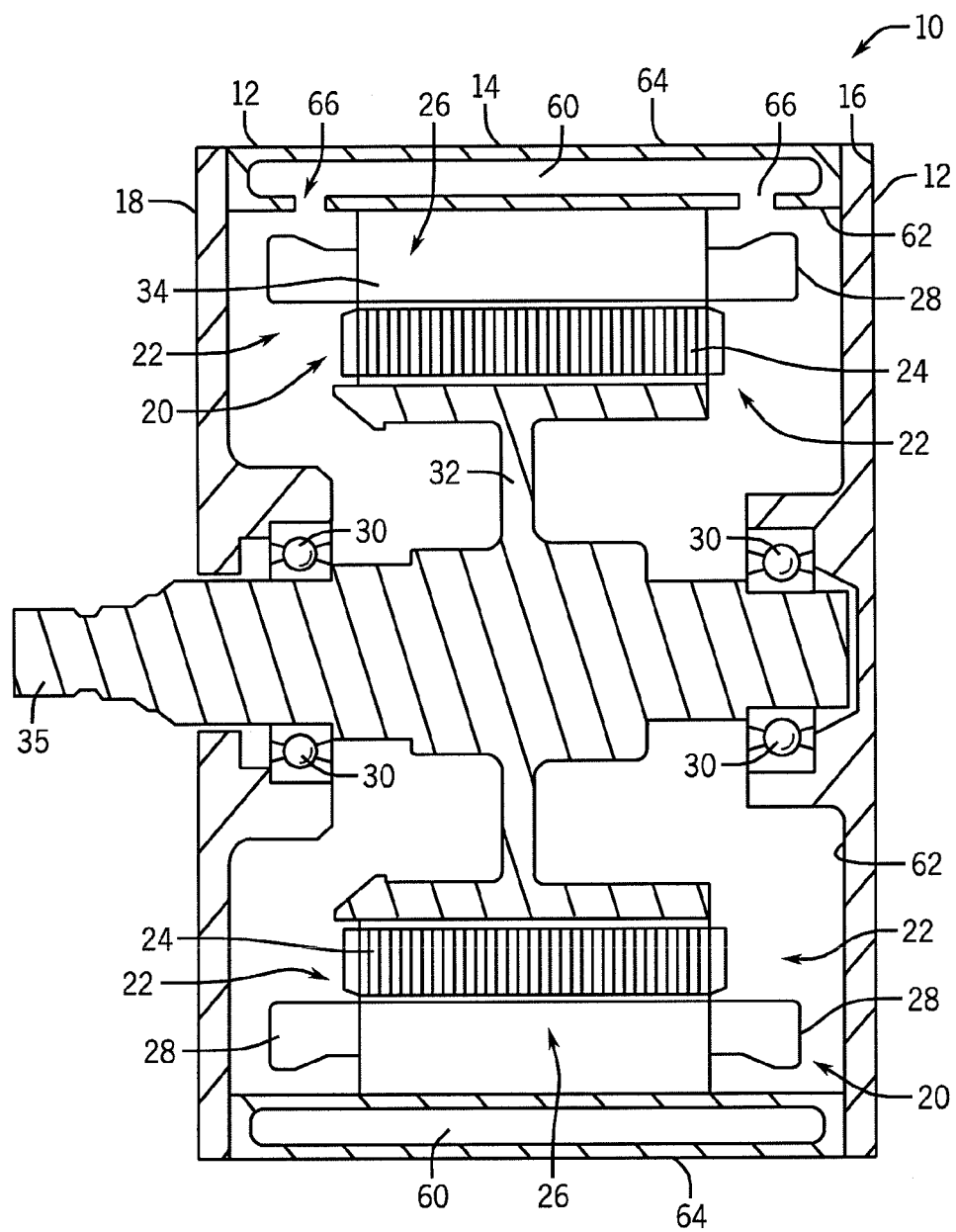
FIG. 2 is a cross-sectional view of a portion of an electric machine module according to one embodiment of the invention.
Figure 7:
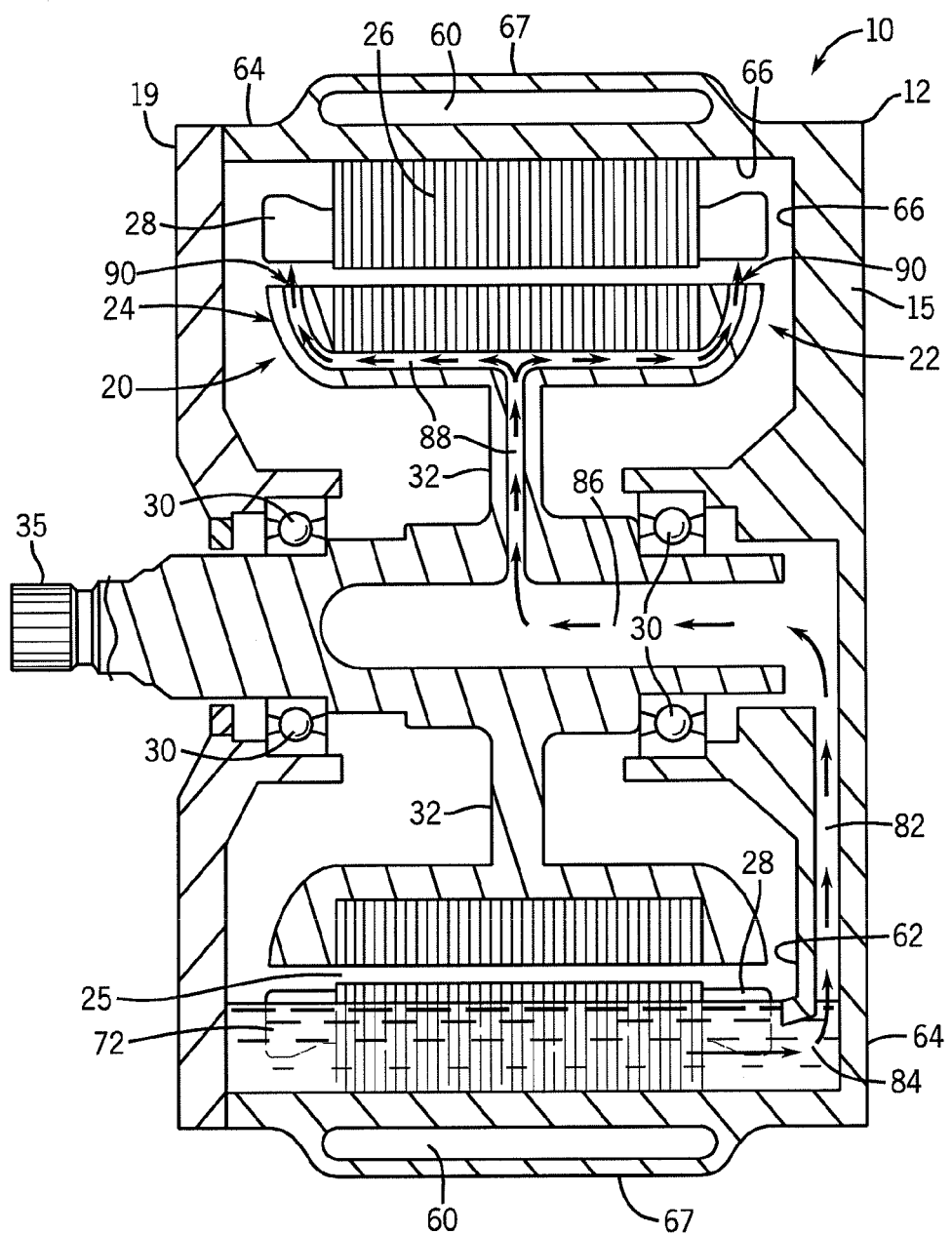
FIG. 7 is a cross-sectional view of an electric machine module according to one embodiment of the invention.

FIGS. 1 and 2 illustrate an electric machine module 10 according to one embodiment of the invention. The module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners 17, or another suitable coupling method, to enclose at least a portion of the electric machine 20 within the machine cavity 22. In some embodiments, as shown in FIG. 7, the housing 12 can comprise a substantially cylindrical canister 15 coupled to a single end cap 19. Further, in some embodiments, the housing 12, including the sleeve member 14 and the end caps 16, 18, can comprise materials that can generally include thermally conductive properties, such as, but not limited to aluminum or other metals and materials capable of generally withstanding operating temperatures of the electric machine. In some embodiments, the housing 12 can be fabricated using different methods including casting, molding, extruding, and other similar manufacturing methods.

The electric machine 20 can include a rotor assembly 24, a stator assembly 26, including stator end turns 28, and bearings 30, and can be disposed about a shaft 35. As shown in FIG. 2, the stator assembly 26 can substantially circumscribe at least a portion of the rotor assembly 24. In some embodiments, the rotor assembly 24 can also include a rotor hub 32 or can have a "hub-less" design (not shown). The electric machine 20 can comprise a substantially conventional configuration. For example, an air gap 25 can be defined between a portion of the stator assembly 26 and a portion of the rotor assembly 24.

In some embodiments, the electric machine 20 can be operatively coupled to the module housing 12. For example, the electric machine 20 can be fit within the housing 12. In some embodiments, the electric machine 20 can be fit within the housing 12 using an interference fit, a shrink fit, other similar friction-based fit that can at least partially operatively couple the machine 20 and the housing 12. For example, in some embodiments, the stator assembly 26 can be shrunk fit into the module housing 12. Further, in some embodiments, the fit can at least partially secure the stator assembly 26, and as a result, the electric machine 20, in both axial and circumferential directions. In some embodiments, during operation of the electric machine 20 the fit between the stator assembly 26 and the module housing 12 can at least partially serve to transfer torque from the stator assembly 26 to the module housing 12. In some embodiments, the fit can result in a generally greater amount of torque retained by the module 10.

The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor for hybrid vehicle applications.

Components of the electric machine 20 such as, but not limited to, the rotor assembly 24, the stator assembly 26, and the stator end turns 28 can generate heat during operation of the electric machine 20. These components can be cooled to increase the performance and the lifespan of the electric machine 20.

Figure 3:
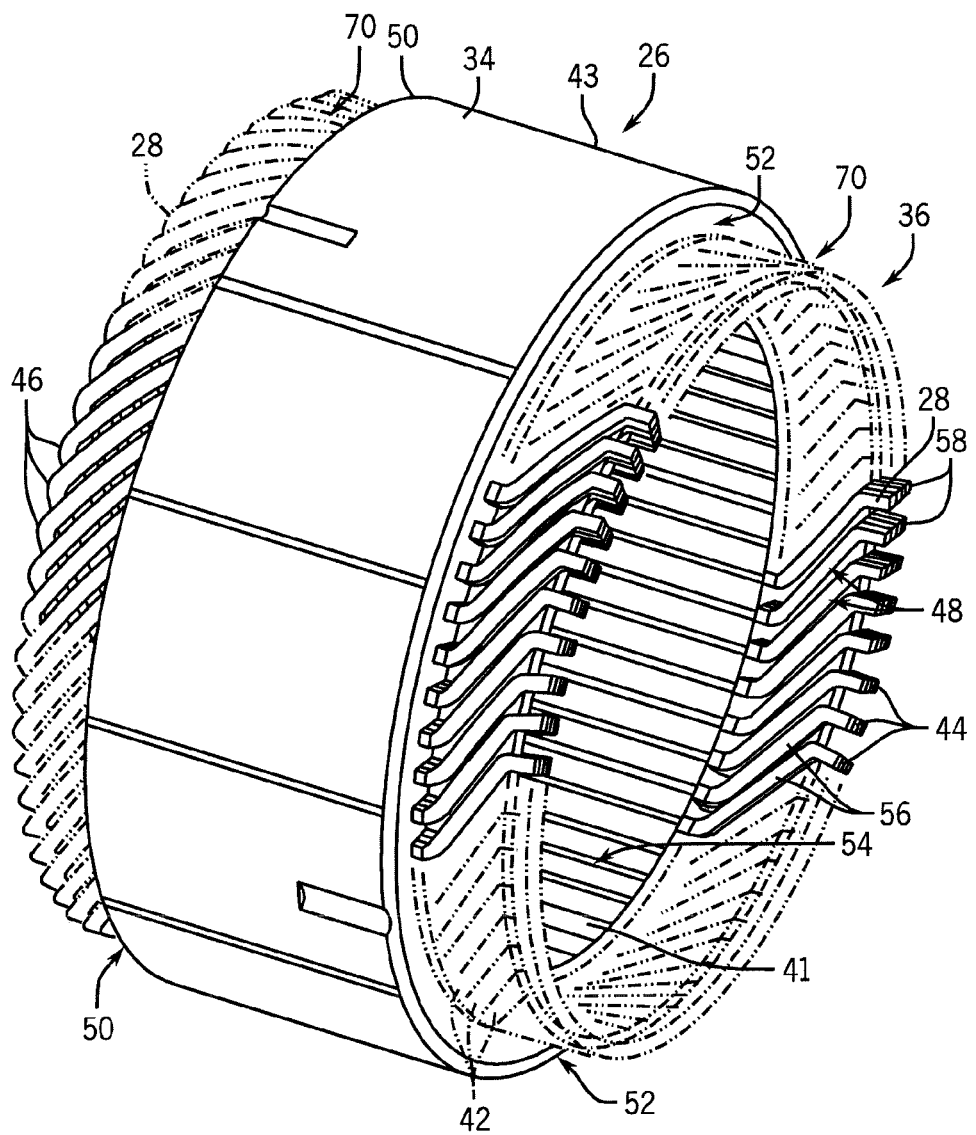
FIG. 3 is a perspective view of a stator assembly according to one embodiment of the invention.
Figure 4:
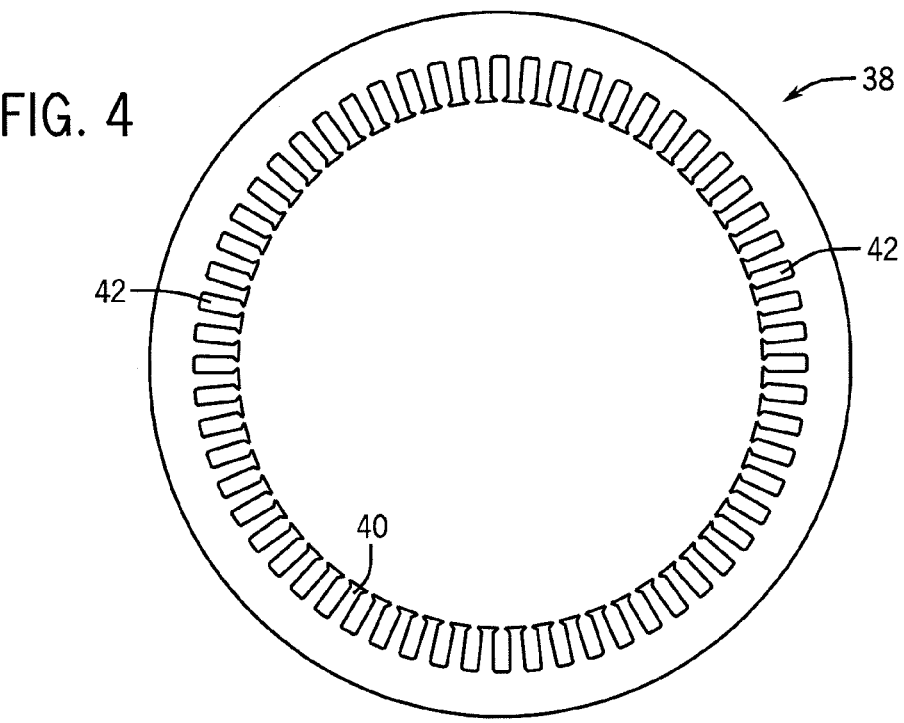
FIG. 4 is front view of a stator lamination according to one embodiment of the invention.

As shown in FIG. 3, in some embodiments, the stator assembly 26 can comprise a stator core 34 and a stator winding 36 at least partially disposed within a portion of the stator core 34. For example, in some embodiments, the stator core 34 can comprise a plurality of laminations 38. Referring to FIG. 4, in some embodiments, the laminations 38 can comprise a plurality of substantially radially-oriented teeth 40. In some embodiments, as shown in FIG. 3, when at least a portion of the plurality of laminations 38 are substantially assembled, the teeth 40 can substantially align to define a plurality of slots 42 that are configured and arranged to support at least a portion of the stator winding 36. As shown in FIG. 4, in some embodiments, the laminations 38 can include sixty teeth 40, and, as a result, the stator core 28 can include sixty slots 42. In other embodiments, the laminations 38 can include more or fewer teeth 40, and, accordingly, the stator core 34 can include more or fewer slots 42. Moreover, in some embodiments, the stator core 34 can comprise an inner perimeter 41 and an outer perimeter 43. For example, in some embodiments, the stator core 34 can comprise a substantially cylindrical configuration so that the inner and outer perimeters 41, 43 can comprise inner and outer diameters, respectively. However, in other embodiments, the stator core 34 can comprise other configurations (e.g., square, rectangular, elliptical, regular or irregular polygonal, etc.), and, as a result, the inner and outer perimeters 41, 43 can comprise other dimensions.

Figure 5:
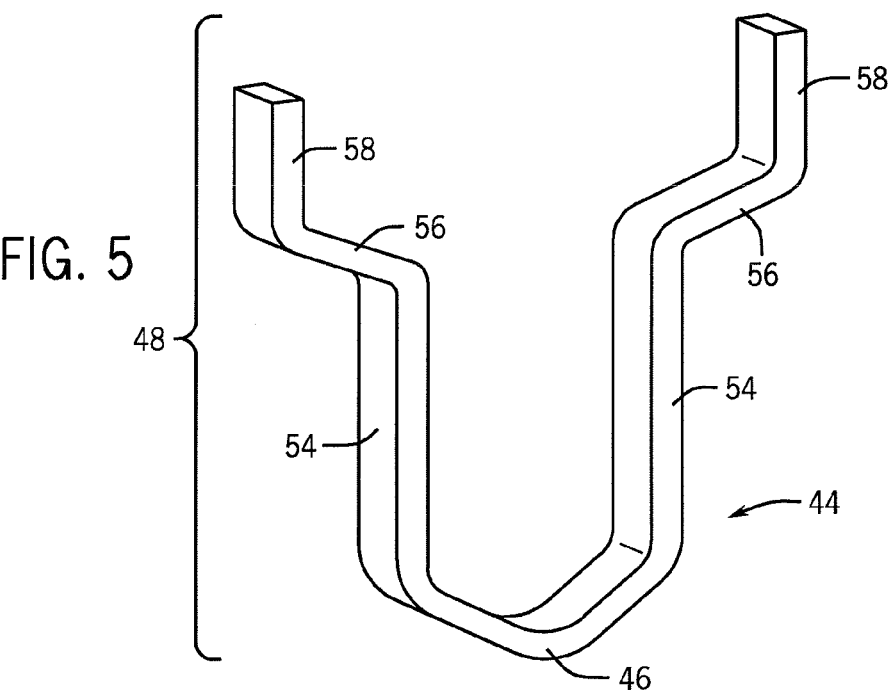
FIG. 5 is a perspective view of a conductor according to one embodiment of the invention.

In some embodiments, the stator winding 36 can comprise a plurality of conductors 44. In some embodiments, the conductors 44 can comprise a substantially segmented configuration (e.g., a hairpin configuration), as shown in FIGS. 3 and 5. For example, in some embodiments, at least a portion of the conductors 44 can include a turn portion 46 and at least two leg portions 48. The turn portion 46 can be disposed between the two leg portions 48 to connect the two leg portions 48, which can be substantially parallel. Moreover, in some embodiments, the turn portion 46 can comprise a substantially "u-shaped" configuration, although, in some embodiments, the turn portion 46 can comprise a v-shape, a wave shape, a curved shape, and other shapes. Additionally, in some embodiments, as shown in FIG. 5, at least a portion of the conductors 44 can comprise a substantially rectangular cross section. In some embodiments, at least a portion of the conductors 44 can comprise other cross-sectional shapes, such as substantially circular, square, hemispherical, regular or irregular polygonal, etc. In some embodiments, the conductors 44 can comprise other configurations (e.g., substantially non-segmented configuration).

In some embodiments, as shown in FIG. 3, at least a portion of the conductors 44 can be positioned substantially within the slots 42. For example, in some embodiments, the stator core 34 can be configured so that the plurality of slots 42 are substantially axially arranged. The leg portions 48 can be inserted into the slots 42 so that at least some of the leg portions 48 can axially extend through the stator core 34. In some embodiments, the leg portions 48 can be inserted into neighboring slots 42. For example, the leg portions 48 of a conductor 44 can be disposed in slots that are distanced approximately one magnetic-pole pitch apart (e.g., six slots, eight slots, etc.). In some embodiments, a plurality of conductors 44 can be disposed in the stator core 34 so that at least some of the turn portions 46 of the conductors 44 axially extend from the stator core 34 at a first axial end 50 of the stator core 34 and at least some of the leg portions 48 axially extend from the stator core 34 at a second axial end 52 of the stator core 34. In some embodiments, at least a portion of the conductor 44 regions that axially extend from the core 34 at the axial ends 50, 52 can comprise the stator end turns 28.

In some embodiments, the conductors 44 can be generally fabricated from a substantially linear conductor 44 that can be configured and arranged to a shape substantially similar to the conductor in FIG. 5. For example, in some embodiments, a machine (not shown) can apply a force (e.g., bend, push, pull, other otherwise actuate) to at least a portion of a conductor 44 to substantially form the turn portion 46 and the two leg portions 48 of a single conductor 44.

In some embodiments, at least some of the leg portions 48 can comprise multiple regions. The leg portions 48 can comprise in-slot portions 54, angled portions 56, and connection portions 58. In some embodiments, as previously mentioned, the leg portions 48 can be disposed in the slots 42 and can axially extend from the first end 50 to the second end 52. In some embodiments, after insertion, at least a portion of the leg portions 48 positioned within the slots 42 can comprise the in-slot portions 58. In some embodiments, in some or all of the slots 42, the leg portions 48 can be substantially radially aligned, as shown in FIG. 3. In some embodiments, in some or all of the slots 42, the leg portions 48 can comprise other configurations.

In some embodiments, at least some of stator end turns 28 extending from the stator core 34 at the second axial end 52 can comprise the angled portions 56 and the connection portions 58. In some embodiments, after inserting the conductors 44 into the stator core 34, the leg portions 48 extending from the stator core 34 at the second axial end 52 can undergo a twisting process (not shown) that can lead to the formation of the angled portions 56 and the connection portions 58. For example, in some embodiments, the twisting process can give rise to the angled portions 56 at a more axially inward position and the connection portions 58 at a more axially outward position, as shown in FIGS. 3 and 5. In some embodiments, after the twisting process, the connection portions 58 of at least a portion of the conductors 44 can be immediately adjacent to connection portions 58 of other conductors 44. As a result, the connection portions 58 can be coupled together to form one or more stator windings 36. In some embodiments, the connection portions 58 can be coupled via welding, brazing, soldering, melting, adhesives, or other coupling methods. Additionally, in some embodiments, the angled portions 56 and the connection portions 58 can extend from the first axial end 50 and can be configured and arranged in a similar manner as some previously mentioned embodiments.

Figure 6:
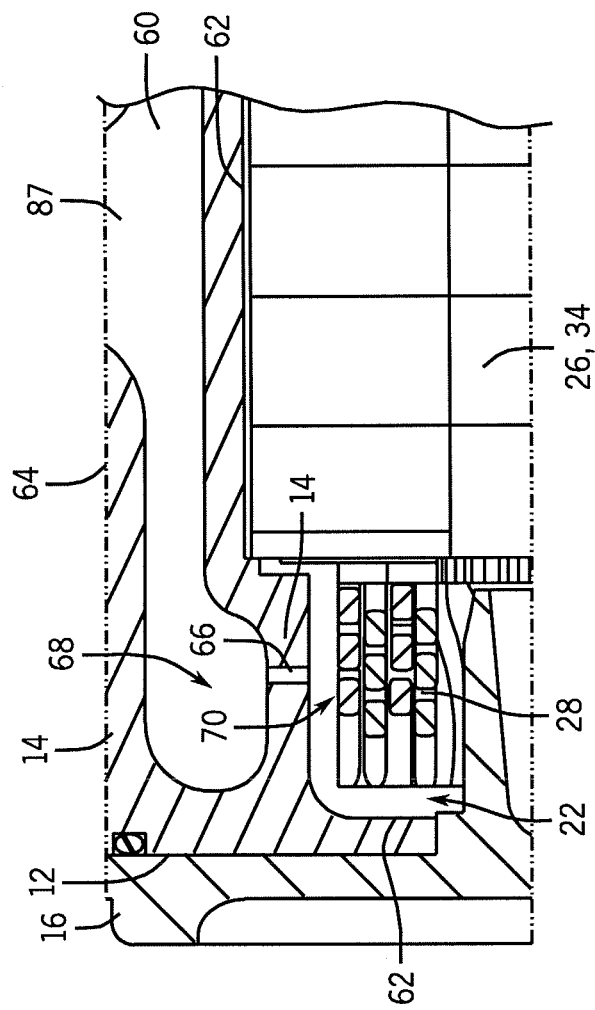
FIG. 6 is a partial cross-sectional view of a portion of an electric machine module according to one embodiment of the invention.

As shown in FIGS. 2, 6, and 7, in some embodiments, the housing 12 can comprise at least a portion of a coolant jacket 60. For example, as shown in FIGS. 2 and 6, in some embodiments, the housing 12 can include an inner surface 62 and an outer surface 64 and the coolant jacket 60 can be positioned substantially between at least a portion the surfaces 62, 64. In some embodiments, the coolant jacket 60 can comprise an alternative configuration. For example, as shown in FIG. 7, in some embodiments, the outer surface 64 of the housing 12 can comprise a portion of the coolant jacket 60 and a coolant jacket member 67 can be coupled to the outer surface 64 to form the coolant jacket 60. In some embodiments, the coolant jacket member 67 can comprise a portion of a separate housing (e.g., a transmission housing, an engine housing, etc.), which can be positioned adjacent to the outer surface 64 to define the coolant jacket 60.

In some embodiments, the machine cavity 22 can be at least partially defined by the inner surface 62 (e.g., each of the elements of the housing 12 can comprise a portion of the inner surface 62). In some embodiments, the coolant jacket 60 can substantially circumscribe at least a portion of the electric machine 20. For example, in some embodiments, the coolant jacket 60 can substantially circumscribe at least a portion of the outer perimeter 43 of the stator assembly 26 (e.g., the stator core 34 and the stator winding 36), including portions of the stator end turns 28.

Further, in some embodiments, the coolant jacket 60 can contain a first coolant that can comprise transmission fluid, ethylene glycol, an ethylene glycol/water mixture, water, oil, motor oil, a gas, a mist, or another substance. The coolant jacket 60 can be in fluid communication with a coolant source (not shown), which can pressurize the coolant prior to or as it is being dispersed into the coolant jacket 60 via one or more inlets 87, so that the pressurized coolant can circulate through the coolant jacket 60. Additionally, in some embodiments, the coolant jacket 60 can be in thermal communication with some elements of the electric machine 20 (e.g., the stator assembly 26) so that at least a portion of the thermal energy generated by the electric machine 20 can be transferred to the first coolant (e.g., via conduction, convention, or any other energy-transfer method). For example, in some embodiments, the coolant jacket 60 can substantially circumscribe a portion of the stator assembly 26 so that as the first coolant circulates through the coolant jacket 60, the first coolant can receive a portion of the thermal energy rejected by the stator assembly 26. After circulating through the coolant jacket 60, the first coolant can be directed to a heat transfer element (e.g., a radiator, a heat exchanger, etc.) (not shown), which can remove the heat energy from the first coolant and then the first coolant can be recirculated through the coolant jacket 60 for additional cooling.

Also, in some embodiments, the inner surface 62 can comprise one or more coolant apertures 66 so that the coolant jacket 60 can be in fluid communication with the machine cavity 22, as shown in FIGS. 2 and 6. In some embodiments, the coolant apertures 66 can be positioned substantially adjacent to the stator end turns 28. For example, in some embodiments, as the pressurized coolant circulates through the coolant jacket 60, at least a portion of the coolant can exit the coolant jacket 60 through the coolant apertures 66 and enter the machine cavity 22. Also, in some embodiments, the coolant can contact the stator end turns 28, which can lead to at least partial cooling. After exiting the coolant apertures 66, at least a portion of the coolant can flow through the machine cavity 22 and can contact various module 10 elements, which, in some embodiments, can lead to at least partial cooling of the module 10. Moreover, as shown in FIG. 7, in some embodiments, the coolant jacket 60 can be substantially or completely sealed relative to the machine cavity 22. For example, in some embodiments, the first coolant can pass through the coolant jacket 60 and no material amounts of the first coolant will enter the machine cavity 22 and contact the electric machine 20.

According to some embodiments of the invention, the coolant jacket 60 can include multiple configurations. In some embodiments, at least a portion of the coolant jacket 60 can extend through portions of the housing 12 (e.g., the sleeve member 14) a distance substantially similar to an axial length of the stator assembly 26. For example, an axial length of a portion of the coolant jacket 60 can extend at least the same distance as the axial length of the stator assembly 26, including the stator end turns 28. In some embodiments, portions of the coolant jacket 60 can extend greater and lesser axial distances, as desired by manufacturers and/or end users for cooling.

In some embodiments, a portion of the coolant jacket 60 also can comprise at least one radial extension 68. For example, as shown in FIG. 6, in some embodiments, a region of the inner surface 62 can be radially recessed so that the radial extension 68 of the coolant jacket 60 can be substantially adjacent to at least a portion of the stator end turns 28. In some embodiments, radial extensions 68 can be positioned adjacent to one side of, both sides of, or neither sides of the stator end turns 28. Further, in some embodiments, the coolant jacket 60 can comprise radial extensions 68 substantially continuously adjacent to at least a portion of an outer diameter 70 of at least one set of the stator end turns 28 (i.e., one continuous radial extension 68 around at least a portion of a circumference of at least one set of the stator end turns 28). In other embodiments, the coolant jacket 60 can comprise substantially discrete radial extensions 68 positioned around at least a portion of the outer diameter 70 of at least one set of the stator end turns 28. In some embodiments, the housing 12 can comprise at least two radial extensions 68. For example, in some embodiments, the housing 12 can comprise two halves coupled together in a substantially axially central location so that each half of the housing 12 can comprise a radial extension 68 and the electric machine 20 can be positioned substantially between the two halves. Moreover, in some embodiments, the radial extension 68 can comprise a radial length substantially similar to other portions of the coolant jacket 60.

In some embodiments, the stator end turns 28 can comprise a generally lesser outer diameter 70 compared to the outer diameter 43 of the stator core 34. As a result, a greater distance can exist between the stator end turns 28 and the cooling jacket 60 in some conventional configurations because at least some conventional coolant jackets 60 comprise a generally linear and/or uniform configuration (e.g., some conventional coolant jackets 60 comprise a generally planar configuration). In some embodiments, the radial extensions 68 of the coolant jacket 60 can enhance module 10 cooling because some of the coolant can circulate relatively closer to the stator end turns 28, compared to conventional coolant jacket 60 configurations that lack radial extensions 68. As a result, in some embodiments, a distance between the circulating coolant and an area rejecting thermal energy (e.g., the stator end turns 28) can be minimized, which can lead to generally increased heat energy transfer.

In some embodiments, the module 10 can comprise at least one coolant sump 72. As shown in FIG. 7, the coolant sump 72 can be in fluid communication with the machine cavity 22. For example, in some embodiments, the coolant sump 72 can be positioned at or near a bottom or lower portion of the machine cavity 22. In some embodiments, the coolant sump 72 can be configured and arranged to contain a second coolant, such as oil, vaporizable dielectric fluid, an oil/vaporizable dielectric fluid mixture, or a similar substance. For example, in some embodiments, the second coolant can include properties such as, but not limited to: a high dielectric constant, low electrical conductivity, high thermal conductivity, and an ability to lubricate module 10 components.

In some embodiments, during operation of the electric machine 20, a resting level of the second coolant present within the coolant sump 72 can generally be located below the air gap 25 between the rotor and stator assemblies 24, 26. By keeping material and/or significant amounts of the second coolant out of the air gap 25, coolant shearing, the introduction of significant amounts of air, and other complications can be avoided. Moreover, as shown in FIG. 7, the second coolant can cover and/or coat at least a portion of the stator end turns 28 positioned in the lower portion of the machine cavity 22. Additionally, in some embodiments, the second coolant and the coolant sump 72 can comprise a portion of a closed-loop cooling system. For example, the module 10 can remain substantially sealed so most of the second coolant remains within the machine cavity 22 and/or the coolant sump 72, unless the housing 12 is disassembled.

Figure 8:
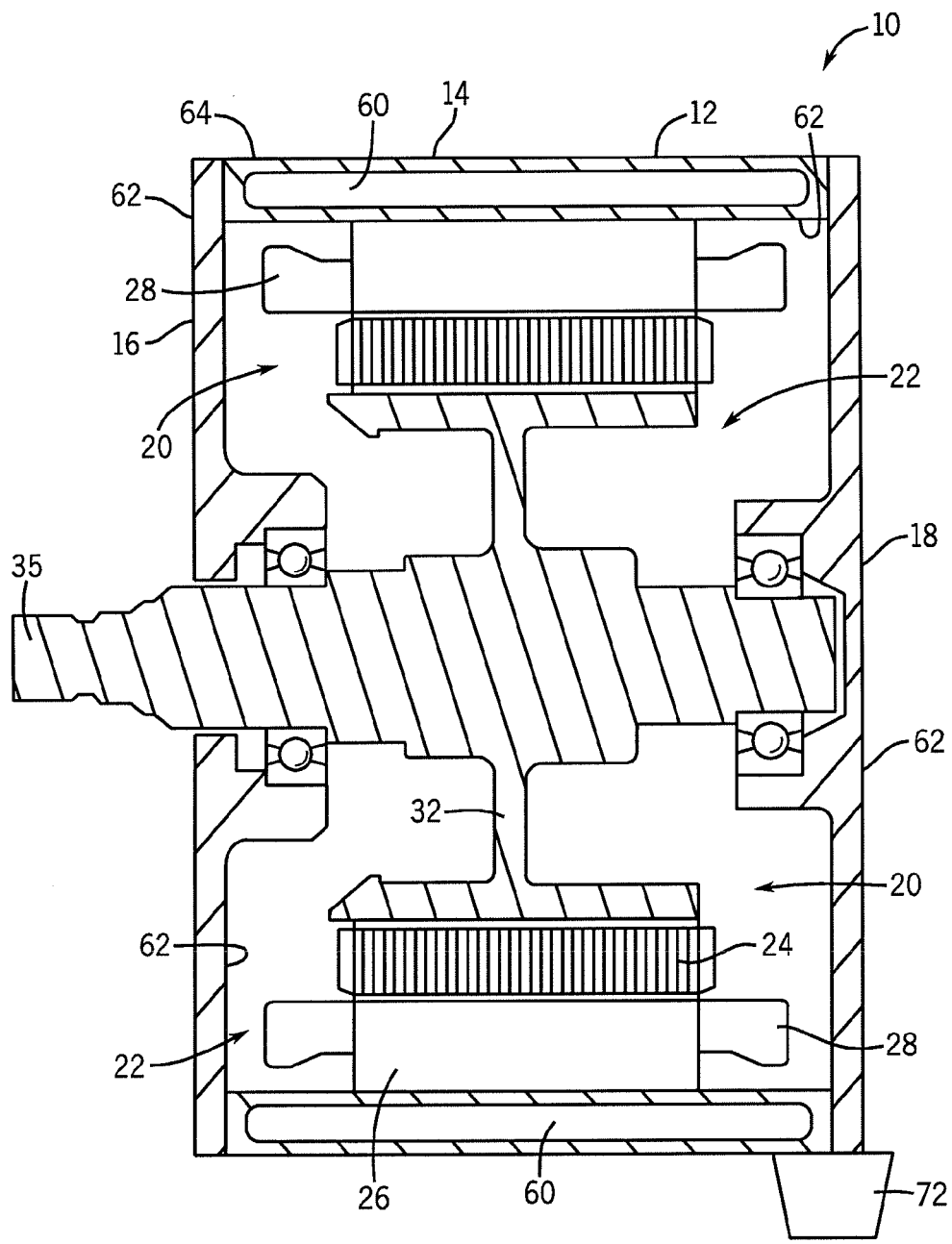
FIG. 8 is a cross-sectional view of an electric machine module according to one embodiment of the invention.

In some embodiments, the coolant sump 72 can comprise alternative configurations. For example, in some embodiments, the coolant sump 72 can comprise structures coupled to and/or integral with some portions of the inner surface 62 of the housing 12 (i.e., structures extending axially and/or radially inward from the inner wall 62 of the housing 12 to define the coolant sump 72). In some embodiments, the coolant sump 72 can be a structure operatively coupled a bottom portion of the housing 12 and in fluid communication with the machine cavity 22, as shown in FIG. 8. Further, in some embodiments, the structure can be substantially arcuate to substantially align with the bottom portion of the outer surface 64 of the housing 12. In some embodiments, the structure can be substantially integral with a portion of the housing 12. Moreover, in some embodiments, the coolant sump 72 can comprise a separate reservoir remotely positioned relative to the housing 12 and in fluid communication with the machine cavity 22.

Figure 9:
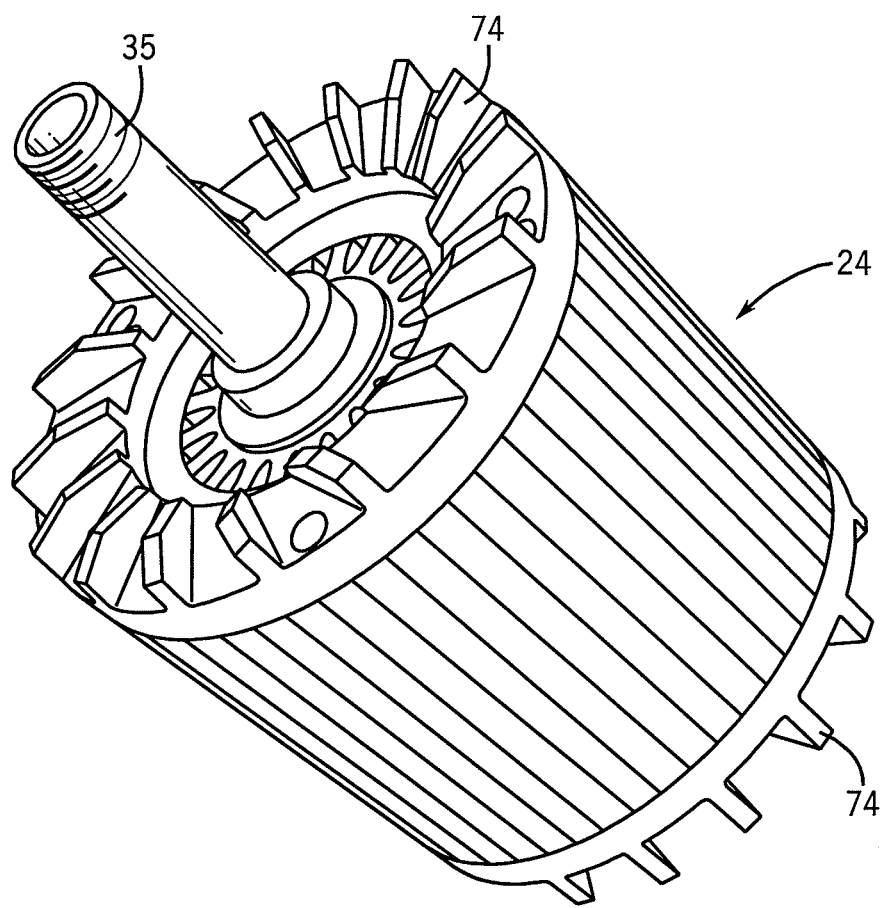
FIG. 9 is a perspective view of a rotor assembly according to one embodiment of the invention.

In some embodiments, the second coolant can be dispersed in different manners through at least a portion the machine cavity 22. In some embodiments, at least a portion of the second coolant can be drawn from the coolant sump 72 in a generally upward direction by a pump or a structure which creates a pumping effect. In some embodiments, the pump and/or the structure which creates a pumping effect can comprise different forms. In some embodiments, the rotor assembly 24 can comprise one or more centrifugal fans 74 coupled to one or both axial ends of the rotor assembly 24, as shown in FIG. 9. For example, the rotor assembly 24 and the centrifugal fans 74 can be coupled together so that the centrifugal fans 74 can rotate synchronously with the rotor assembly 24 during electric machine 20 operations. As a result, when the electric machine 20 is in operation, the centrifugal fans 74 can contact the second coolant disposed in the coolant sump 72 and can pull the second coolant from the coolant sump 72 and disperse or sling the second coolant through portions of the motor cavity 22 to contact portions of the housing 12 and the electric machine 20 (e.g., the stator end turns 28).

Additionally, in some embodiments, when the electric machine 20 is in operation, the moving rotor assembly 24 can create an area of localized low pressure substantially at or near the surface level of the second coolant in the coolant sump 72 (i.e., the Bernoulli Effect can draw least a portion of the second coolant toward the rotor assembly 24). When the second coolant contacts the rotor assembly 24, the second coolant can be carried by the rotor assembly 24 and centrifugally dispersed in a substantially outward path through portions the machine cavity 22, thus contacting at least the stator assembly 26, the stator end turns 28, and/or the bearings 30.

Figure 10:
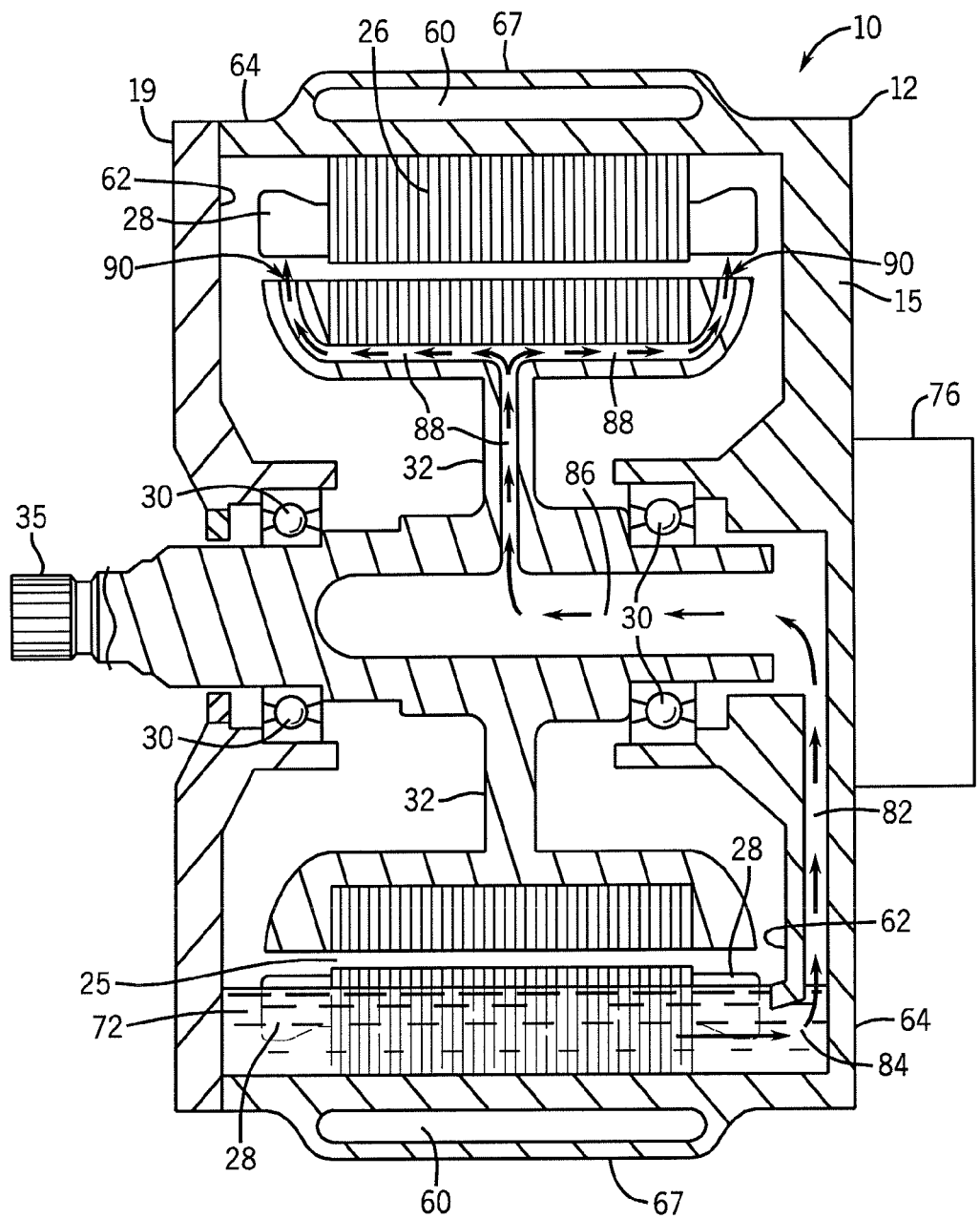
FIG. 10 is a cross-sectional view of an electric machine module according to one embodiment of the invention.
Figure 11:
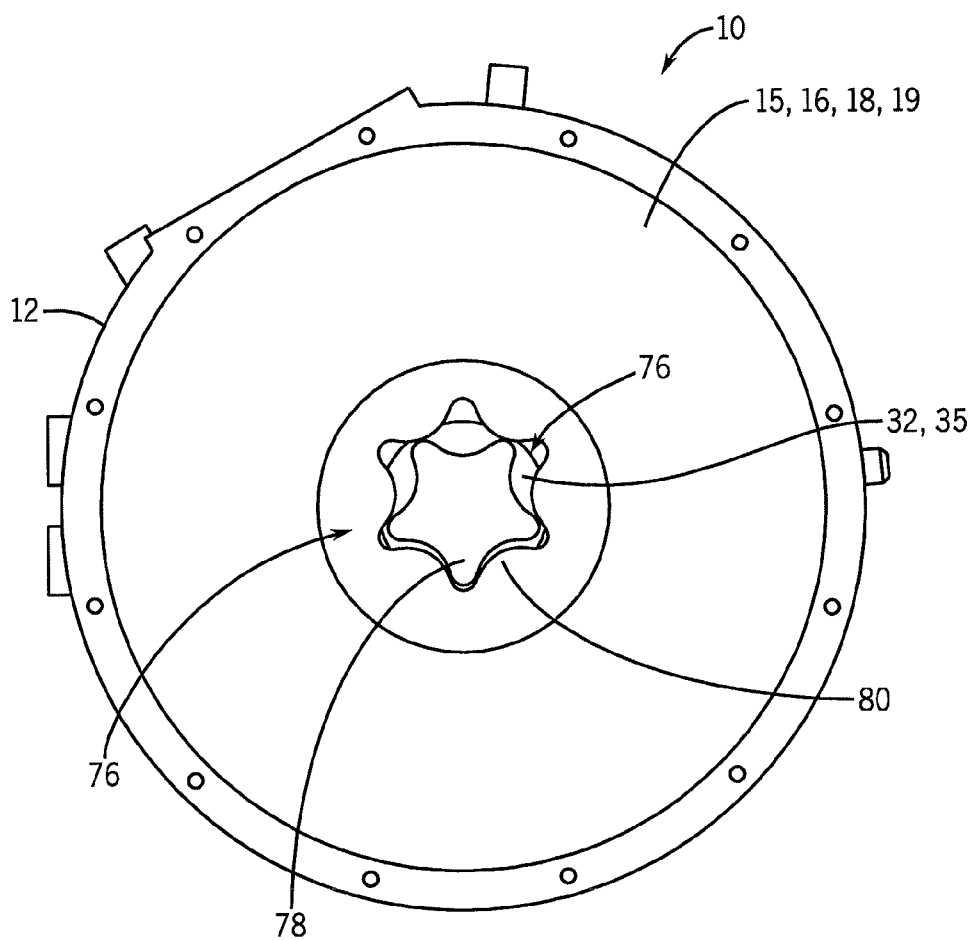
FIG. 11 is a side view of an electric machine module according to one embodiment of the invention.

Furthermore, in some embodiments, the pump or the structure which creates a pumping effect can comprise any variety of conventional pump 76 or other similar structures that can disperse the second coolant. In some embodiments, the pump 76 can be operatively coupled to the housing 12, rotor hub 32, other portions of the rotor assembly 24, and/or the shaft 35, as shown in FIGS. 10 and 11. For example, in some embodiments, the pump 76 can be integrated into at least one portion the housing 12, integrated into the rotor hub 32, or it can be an integral portion of the electric machine 20. In some embodiments, the pump 76 can comprise a conventional pump (e.g., an electric pump, a gear-type pump, a vane-type pump, a centrifugal pump, or other suitable conventional pumps) that can be coupled to the outer surface 64 (as shown in FIG. 10) or remotely located and in fluid communication with at least the machine cavity 22 and the coolant sump 72.

By way of example only, in some embodiments, the pump 76 can comprise a conventional gerotor-type pump 76, as shown in FIG. 11. For example, the gerotor-type pump 76 can be operatively coupled to and/or integral with a portion of the shaft 35 so that the movement of the shaft 35 during operation of the machine 20 can drive operation of the pump 76. In some embodiments, the gerotor-style pump 76 can comprise an inner rotor 78 and an outer rotor 80. In some embodiments, the inner rotor 78 can be operatively coupled to the rotor hub 32 and/or the shaft 35 and the outer rotor 80 can be operatively coupled to at least one the end caps 16, 18, and 19 (e.g., either the inner surface 62 or the outer surface 64) or other locations proximal to the module 10. For example, in some embodiments, the inner rotor 78 can be operatively coupled to elements of the module 10 so that the inner rotor 78 is generally concentric with the rotor hub 32 and/or the shaft 35 and the outer rotor 80 is disposed generally radially outward relative to at least a portion of the inner rotor 78. The rotor hub 32 and/or the shaft 35 can move during operation of the electric machine 20, which can lead to movement of the inner rotor 78. The divergence of the inner rotor 78 and the outer rotor 80 can create a suction force which draws the second coolant into the pump 76, and the merging of the inner rotor 78 and the outer rotor 80 create pressure which forces the second coolant out of the pump 76. As a result, in some embodiments, the pump 76 can aid in dispersing of the second coolant through the module 10, as described in further detail below.

As shown in FIG. 7, in some embodiments, the housing 12 can include at least one coolant channel 82. In some embodiments, the coolant channel 82 can be generally positioned between the inner surface 62 and the outer surface 64. The coolant channel 82 can be in fluid communication with the coolant sump 72 through a sump outlet 84 and can extend through at least a portion of the housing 12, as shown in FIG. 7. Also, in some embodiments, the sump outlet 84 and the coolant channel 82 can be positioned at or substantially adjacent to one axial end of the coolant sump 72 and the housing 12, respectively, as shown in FIG. 7.

As shown, in FIG. 7, in some embodiments, the coolant channel 82 can be in fluid communication with a shaft channel 86. For example, a portion of the shaft 35 can comprise the shaft channel 86 positioned substantially within the shaft 35 and arranged in a generally axial orientation, as shown in FIG. 7. In some embodiments, the shaft channel 86 can extend the entire axial length of the shaft 35. In other embodiments, the shaft channel 86 can extend a length less than the axial length of the shaft 35, as shown in FIG. 7.

Additionally, in some embodiments, a portion of the rotor assembly 24 (e.g., the rotor hub 32) can include a rotor channel 88. In some embodiments, the rotor channel 88 can extend some or all of the radial length of the rotor assembly 24 (i.e., from an inner diameter of the rotor assembly 24 to an outer diameter of the rotor assembly 24). In other embodiments, the rotor channel 88 can extend a length less than the radial length of the rotor assembly 24. In some embodiments, the rotor channel 88 can be in fluid communication with the shaft channel 86 and the machine cavity 22, as shown in FIG. 7. For example, as shown in FIG. 7, at a position adjacent to the outer diameter of the rotor assembly 24, the rotor channel 88 can divide into at least two rotor channels 88, as shown in FIG. 7. For example, in some embodiments, the rotor assembly 24 can comprise one or more coolant outlets 90 that are in fluid communication with the rotor channels 88. Moreover, the coolant outlets 90 can be configured and arranged so that a portion of the exiting second coolant can be directed toward the stator end turns 28 and other portions of the stator assembly 26 and the housing 12 for cooling, as shown by the arrows in FIG. 7.

In some embodiments, the second coolant can be dispersed within portions of the module 10 to aid in cooling and lubricating module 10 components. In some embodiments, the pump 76 can cause a portion of the second coolant to flow from the coolant sump 72, through the sump outlet 84 and into the coolant channel 82 (e.g., the pump 76 can draw at least a portion of the second coolant in a generally radially inward direction). In some embodiments, the pump 76 can then direct at least a portion of the second coolant to flow through the shaft channel 86 and the rotor channel 88 and enter the machine cavity 22 via the coolant outlets 90, where the second coolant can aid in cooling the module 10 components. Furthermore, as the coolant passes through the channels 82, 86, and 88, the second coolant can receive at least a portion of the thermal energy generated by the housing 12, the shaft 35, and the rotor assembly 24, respectively.

When the second coolant contacts any heat energy-generating components of the electric machine 20, such as the rotor assembly 24, the rotor hub 32, and the stator end turns 28, the second coolant can provide cooling due to forced convection of thermal energy from the components to the second coolant. Additionally, the second coolant can provide added lubrication to the bearings 30 and other moving elements of the electric machine module 10.

In some embodiments, the coolant sump 72, the coolant channel 82, the shaft channel 86, the rotor channel 88, and the second coolant can increase thermal energy transfer from at least the stator end turns 28, the rotor assembly 24, and other portions of the electric machine 20 and can create a more effective way to sink thermal energy into the coolant jacket 60. For example, as the second coolant is dispersed through portions of the machine cavity 22, the second coolant can receive thermal energy from portions of the electric machine 20 (e.g., the stator end turns 28 and the rotor assembly 24) through forced convection, as previously mentioned. After being dispersed through the machine cavity 22, a portion of the second coolant can flow along the inner surface 62 back towards the coolant sump 72 (e.g., via gravity). Also, the second coolant can contact the inner surface 62 and can be cooled by conducting at least a portion of the thermal energy to the housing 12 before it is recycled back into the coolant sump 72. Moreover, in some embodiments, both axial sides of the electric machine 12 can be in fluid communication via a feature in the outer perimeter 43 of the stator core 34 and/or the inner surface 62 of the housing 14. For example, the feature can comprise a recess positioned on the outer perimeter 43 and/or the inner surface so that the axial ends 50, 52 of the stator assembly 24 can be in fluid communication with each other. As a result, the second coolant in the coolant sump 72 can be maintained at a lower temperature because the heated second coolant can mix with the cooler, unused second coolant, which can reduce the overall temperature. At a lower temperature, the second coolant can remove additional thermal energy from the electric machine 20 when it is recycled through the module 10.

Figure 12:
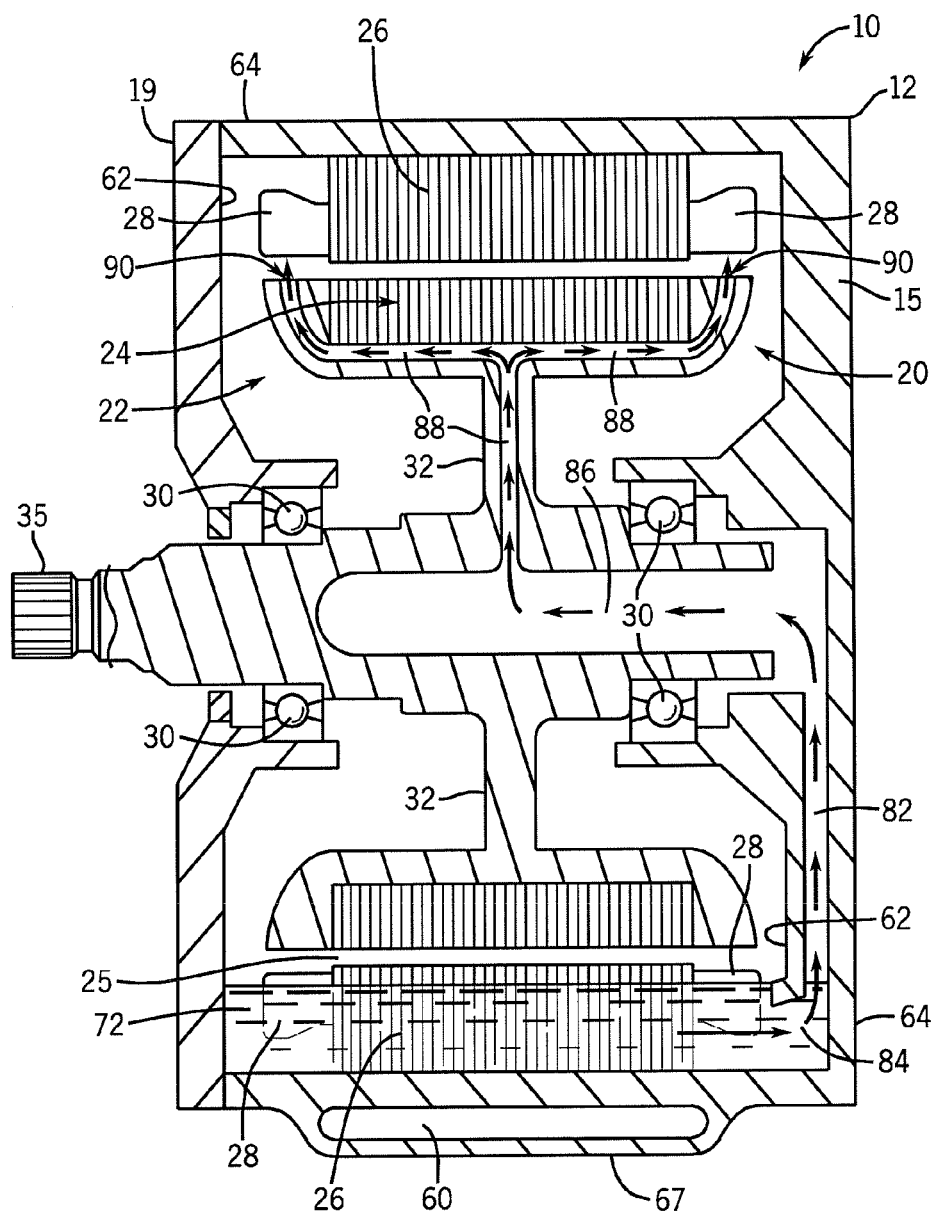
FIG. 12 is a cross-sectional view of an electric machine module according to one embodiment of the invention.

In addition, the coolant sump 72 can be located in the machine cavity 22 substantially adjacent to a portion of the coolant jacket 60, as shown in FIG. 7. For example, the coolant sump 72 can be in thermal communication with the coolant jacket 60. As a result, when the second coolant is recycled back to the coolant sump 72, at least a portion of the thermal energy received from the housing 12 and the electric machine 20 can also be conducted from the second coolant in the coolant sump 72 through the housing 12 and into the coolant jacket 60 and the first coolant. The first coolant can be directed out of the coolant jacket 60 to the heat transfer element, which can help remove the thermal energy from the operating electric machine 20. As a result, the first coolant can be circulated through a heat exchange system and the second coolant can remain within the housing 12 and/or the coolant sump 72 so that the second coolant does not have to pass through any other elements (e.g., a transmission housing), which can simplify installation and maintenance of the electric machine module 10. Also, in some embodiments, the coolant jacket 60 can be localized to a region of the housing 12 substantially adjacent to the coolant sump 72, as shown in FIG. 12. For example, in some embodiments, the coolant jacket 60 can be configured so that it is located adjacent to the coolant sump 72 and does not substantially circumscribe other portions of the module 10 (i.e., the coolant jacket 60 serves as a heat exchange element for the coolant sump 72).

Furthermore, in some embodiments, the housing 12 can be configured so that the coolant sump 72 can surround at least a portion of the coolant jacket 60 (not shown). For example, as previously mentioned, in some embodiments, the coolant sump 72 can be generally external with machine cavity 22, as shown in FIG. 8, and the coolant jacket 60 can be positioned substantially internally with respect to the coolant sump 72 (i.e., the coolant sump 72 and the second coolant can substantially circumscribe and/or surround at least a portion of the coolant jacket 60). As a result of being surrounded by the heated second coolant, thermal transfer from the second coolant to the first coolant can be enhanced.

As a result of increased thermal energy transfer from at least some portion of the electric machine 20 (e.g., the stator end turns 28 and the rotor assembly 24) and more effectively sinking thermal energy into the coolant jacket 60, the coolant sump 72 and/or the coolant channels 82, 86, and 88 with the second coolant can increase the continuous performance of, and reduce the operating temperature of the electric machine 20, thus increasing both durability and efficiency of the electric machine 20. In addition, use of the coolant sump 72 and/or the coolant channels 82, 84, and 86 can the reduce the work required by the first coolant and the coolant jacket 60 to cool the electric machine 20. As a result, a necessary flow rate of the first coolant in the coolant jacket 60 can be reduced, which can increase efficiency of the electric machine module 10 (e.g., by reducing pumping losses to and from the fluid source), and an allowable coolant inlet temperature can be increased, which can reduce the required size of the heat transfer element or eliminate a need for the heat transfer element completely, thus reducing system costs of the electric machine module 10.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
   a housing at least partially defining a machine cavity, the housing further including at least a portion of a coolant jacket capable of containing a first coolant;
   a coolant sump being in fluid communication with the machine cavity, the coolant sump capable of containing a second coolant different from the first coolant, and the coolant sump being in thermal communication with the coolant jacket;
   an electric machine being positioned substantially within the machine cavity and being at least partially enclosed by the housing, the electric machine including a stator assembly comprising stator end turns, a rotor assembly being at least partially circumscribed by a portion of the stator assembly, and a shaft being operatively coupled to the rotor assembly;
   at least one coolant channel being disposed through a portion of the housing, the coolant channel being in fluid communication with the coolant sump;
   at least one shaft channel being disposed through a portion of the shaft, the shaft channel being in fluid communication with the coolant channel; and
   at least one rotor channel being disposed within a portion of the rotor assembly, the rotor channel being in fluid communication with the shaft channel and the machine cavity.

2. The electric machine module of claim 1, wherein the rotor channel is configured and arranged to direct a portion of the second coolant in a generally radially outward direction toward the stator end turns.

3. The electric machine module of claim 1, wherein the first coolant comprises at least one of water and ethylene glycol.

4. The electric machine module of claim 1, wherein the second coolant comprises at least one of an oil, a vaporizable dielectric fluid, and a combination thereof.

5. The electric machine module of claim 1, wherein coolant jacket is sealed relative to the machine cavity.

6. The electric machine module of claim 1 and further comprising at least one pump being in fluid communication with the coolant sump.

7. The electric machine module of claim 6, wherein the pump comprises a gerotor-type pump operatively coupled to the shaft.

8. The electric machine module of claim 6, wherein the pump comprises an electric pump.

9. The electric machine module of claim 8, wherein the electric pump is coupled to a portion of the housing.

10. The electric machine module of claim 1, wherein the coolant jacket comprises a radial extension.

11. The electric machine module of claim 1, wherein the second coolant is retained within a closed-loop system so that the second coolant remains within the coolant sump and the housing.

12. The electric machine module of claim 1, wherein the electric machine is positioned within the machine cavity so that the coolant jacket circumscribes at least a portion of the stator assembly.

13. An electric machine module comprising:
    a housing at least partially defining a machine cavity, the housing further including a coolant jacket;
    a coolant sump being in fluid communication with the machine cavity, the coolant sump capable of containing a second coolant different from a first coolant in the coolant jacket, and the coolant sump being in thermal communication with the coolant jacket;
    an electric machine being positioned within the machine cavity and being at least partially enclosed by the housing, the electric machine including a stator assembly comprising stator end turns, a rotor assembly being at least partially circumscribed by a portion of the stator assembly, and a shaft being operatively coupled to the rotor assembly; and
    an air gap being defined between a portion of the stator assembly and a portion of the rotor assembly, wherein the coolant sump is positioned and sized so that no material amounts of the second coolant enter the air gap; and
    at least one centrifugal fan being coupled to the rotor assembly,
    the centrifugal fan is configured and arranged to disperse the second coolant through at least a portion of the machine cavity.

14. The electric machine module of claim 13 and further comprising at least one coolant channel being disposed through a portion of the housing, the coolant channel being in fluid communication with the coolant sump;
    at least one shaft channel being disposed through a portion of the shaft, the shaft channel being in fluid communication with the coolant channel; and
    at least one rotor channel being disposed within a portion of the rotor assembly, the rotor channel being in fluid communication with the shaft channel and the machine cavity.

15. The electric machine module of claim 14 and further comprising at least one pump being in fluid communication with the coolant sump.

* * * * *